United States Patent [19]

Lunder

[11] Patent Number: 5,612,079
[45] Date of Patent: Mar. 18, 1997

[54] PREPARATION OF COLD-WATER-SOLUBLE INSTANT TEA

[75] Inventor: Tito L. Lunder, Morges, Switzerland

[73] Assignee: Nestec S.A., Vevey, Switzerland

[21] Appl. No.: 321,542

[22] Filed: Oct. 12, 1994

[30] Foreign Application Priority Data

Nov. 18, 1993 [EP] European Pat. Off. .............. 93118574

[51] Int. Cl.⁶ .................................. A23F 5/24; A23F 5/28
[52] U.S. Cl. ............................................ 426/597; 426/388
[58] Field of Search ....................................... 426/597, 388

[56] References Cited

U.S. PATENT DOCUMENTS

| | | | |
|---|---|---|---|
| 4,668,525 | 5/1987 | Creswick | 426/597 |
| 4,680,193 | 7/1987 | Lunder et al. | |
| 4,717,579 | 1/1988 | Vietti et al. | 426/597 |
| 4,748,033 | 5/1988 | Syfert et al. | 426/597 X |

FOREIGN PATENT DOCUMENTS

0067980A1  12/1982  European Pat. Off. .
0940867  11/1963  United Kingdom .

*Primary Examiner*—Anthony J. Weier
*Attorney, Agent, or Firm*—Vogt & O'Donnell, LLP

[57] ABSTRACT

An instant tea soluble in cold water is prepared by extracting a mixture of green tea leaves and black tea leaves with hot water, wherein the leaves of the mixture are, by weight, in ratio of green leaves to black leaves of from 4:1 to 2:1, under a pressure of from 1 atmosphere to 2 atmospheres, and then, the extract is concentrated and dried to obtain a powder. To increase yield, the spent leaves also may be further extracted with hot water, and the extract obtained is combined and concentrated with the extract first obtained from the leaf mixture.

13 Claims, No Drawings

PREPARATION OF COLD-WATER-SOLUBLE INSTANT TEA

BACKGROUND OF THE INVENTION

This invention relates to a process for the production of instant black tea soluble in cold water.

It is known that extracts based on black tea and, more particularly, instant black tea, form a cloudy beverage at ambient temperature. The cloudiness is caused by a precipitate of a complex between caffeine and polyphenols which is known as "cream of tea". This cream is insoluble in cold water and a certain additional treatment of the black tea extract is normally necessary to achieve solubility in cold water. European Patent No. 201 000 describes a process for the production of instant black tea soluble in cold water in which the black tea is extracted, green tea is separately extracted and the two extracts obtained are mixed, concentrated and evaporated to dryness. On the other hand, in this process, most of the tea cream present in the first black tea extract is actually separated in that extract by precipitation through cooling. The disadvantage of this process is that it involves two extractions which is both economically and industrially unacceptable because it leads to a further increase in the price of the instant tea obtained.

SUMMARY OF THE INVENTION

The problem addressed by the present invention was to provide a process in which the problem caused by the tea cream would be solved by carrying out a single extraction. It has been found that, by directly subjecting black tea to extraction in admixture with green tea, there is no longer any cream of tea in the sense defined above, so there is no longer any need to provide an additional treatment step for eliminating the tea cream.

Accordingly, the present invention relates to a process for the production of instant black tea soluble in cold water, in which a mixture of black tea and green tea is subjected to co-extraction with hot water under a pressure of 1 to 2 atmospheres and the extract obtained is concentrated and then dried to obtain a tea powder soluble in cold water.

DETAILED DESCRIPTION OF THE INVENTION

Although not wishing to be bound by a scientific theory, it seems to applicants that extraction with green tea enables the caffeine to be decomplexed from the polyphenols present in the black tea so that it forms another complex with the polyphenols of green tea, the complex thus formed being soluble in cold water so that no other treatment is necessary and an instant powder dissolving clearly in cold water is directly obtained.

It has been found that the green tea and black tea have to be mixed in a certain ratio by weight of a ratio of green tea to black tea of in the range from 4:1 to 2:1. If too much green tea is added, the characteristic colour of the black tea is reduced whereas, if too little green tea is added, an inadequate quantity of polyphenols is extracted from the green tea to avoid the formation of cream characteristic of black tea.

In the context of the invention, the expression "green tea" designates the material obtained from the tea shrub Camellia sinensis, for example the freshly picked tea leaves, the fresh leaves of green tea which are dried immediately after picking, the fresh leaves of green tea which have been heat-treated before drying to inactivate their enzymes and aqueous extracts of these leaves. It should be understood that the tea has undergone hardly any fermentation transforming it into black tea.

In the present description, black tea is understood to be the enzymatic oxidation product of green tea.

The hot water used for extraction may either be water preheated to the required temperature or water obtained by the direct injection of steam. The temperature of the water is between 90° and 130° C., preferably between 110° and 130° C. and more preferably between 120° and 125° C.

The quantity of water used is between 2 and 25 parts by weight and preferably between 5 and 12 parts by weight to 1 part of tea. The extraction time may be up to 30 minutes and is preferably between 2 and 30 minutes.

The tea leaves are extracted either by percolation or in countercurrent, still with tea leaves, in one or more cells equipped with a filter system preventing particles of tea leaves from entering the extract for thereby isolating the extract from the extracted leaves, i.e., the "spent leaves" as also used herein, of the green and black tea mixture. Even with the filter system, the extract isolated from the extracted, or spent, leaf mixture is subjected to centrifugation before concentration to eliminate fine particles from the tea.

Concentration of the isolated hot tea extract is carried out in vacuo so that the extract has a higher dry matter content by the time it arrives at the drying system. The extract is concentrated to a dry matter content of 10 to 30% and preferably 15 to 25% by weight.

The concentrated extract is dried either by spray drying or by freeze drying.

The process according to the invention is normally carried out under a pressure of 1 to 2 atmospheres because, if it is carried out under higher pressures, unwanted products are obtained in the extract.

The process according to the invention may be carried out in a single step. However, it has been found that, if the process described above is repeated with the spent leaves from the first extraction and a fresh quantity of water, the yield is increased to 40%. In this case, a first extraction is carried out under the conditions described above to obtain a primary extract isolated form the leaf mixture, another extraction is carried out with fresh water under the same conditions to obtain a further extract and the two isolated extracts are combined, concentrated and dried. The water used for the extractions is advantageously deionized water.

The process according to the invention gives a tea powder which is perfectly soluble in cold water and the drink obtained by reconstitution with water has excellent stability and organoleptic properties.

EXAMPLES

The process according to the invention is illustrated by the following Examples.

Example 1

300 g of leaves in the form of a mixture of 200 g of green tea and 100 g of black tea are introduced into an extraction cell. A cover is put on to close the cell, after which 4500 g of fresh deionized water are introduced into the cell, circulating in a closed circuit by means of a pump. The water is heated to a temperature of 120° C. in 45 seconds by means of a steam injection system. The back-pressure valve guarantees a pressure of 2 bar in the system. The water circulates for 15 minutes and the extract is continuously recycled.

After the 15 minutes, the pump is stopped and 2000 g of fresh deionized water are introduced to wash the partly spent leaves.

The extract is combined with this fresh washing water and concentrated to a dry matter content of 20%. The concentrate is then spray dried, forming a powder which is perfectly soluble in cold water without any turbidity. The yield obtained is 38%, i.e. 114 g of instant powder are obtained.

Example 2

The procedure is as described in Example 1, except that a second extraction is carried out with 4500 g of fresh deionized water under the same conditions as in the first extraction step of the preceding example. The two extracts are concentrated and spray dried, a yield of 40% being obtained.

Example 3

A mixture of 60 g of green tea and 20 g of black tea is used. This mixture is introduced into an extraction cell where a first extraction is carried out for 15 minutes under a pressure of 1.5 bar with 1200 g of deionized water heated to 110° C.

A second extraction is then carried out with 1200 g of water under the same conditions as the first extraction.

The two extracts are combined, concentrated and spray dried.

A tea powder perfectly soluble in cold water is obtained in a yield of 40%.

I claim:

1. A process for preparing an instant tea product comprising steps of extracting a mixture of green tea leaves and black tea leaves with hot water, wherein the leaves of the mixture are, by weight, in ratio of green leaves to black leaves from 4:1 to 2:1, under a pressure of from 1 atmosphere to 2 atmospheres to obtain a tea extract from the mixture and isolating the tea extract from extracted mixture to obtain a primary tea extract, concentrating the primary tea extract to obtain a concentrated extract, and drying the concentrated extract to obtain an instant tea product.

2. A process according to claim 1 further comprising extracting the extracted mixture with hot water to obtain a further tea extract, and prior to the concentrating step, combining the further tea extract with the primary tea extract to obtain a combined extract and then concentrating the combined extract to obtain the concentrated extract for drying to obtain the instant tea product.

3. A process according to claim 1 wherein the water is in an amount between 2 parts and 25 parts per part mixture.

4. A process according to claim 1 or 3 wherein the mixture is extracted for from 2 mins to 30 mins.

5. A process according to claim 1 or 3 wherein the mixture is extracted in a cell connected to a circuit so that the water is pumped into and through the cell and so that, prior to the step of isolating the tea extract to obtain the primary tea extract, an aqueous extract is obtained from the cell and recycled back to the cell via the circuit to extract the mixture further to obtain the tea extract and then isolating the tea extract from the extracted mixture to obtain the primary tea extract.

6. A process according to claim 5 further comprising, after the step of isolating the tea extract from the extracted mixture to obtain the primary tea extract, washing the extracted mixture with deionized water to obtain a further extract and prior to the concentrating step, combining the further tea extract with the primary extract to obtain a combined extract and then concentrating the combined extract to obtain the concentrated extract for drying.

7. A process according to claim 5 further comprising, after the step of isolating the tea extract from the extracted mixture to obtain the primary tea extract, extracting the extracted mixture in the cell so that water is pumped into and through the cell and so that an aqueous extract is obtained from the cell and recycled back to the cell to extract the extracted mixture further to obtain a further extract, isolating the further extract from the further extracted mixture and prior to the concentrating step, combining the primary tea extract and the further extract to obtain a combined extract and then concentrating the combined extract to obtain the concentrated extract for drying.

8. A process according to claim 5 wherein the mixture is extracted for from 2 mins to 30 mins.

9. A process according to claim 7 wherein the mixture is extracted for from 2 mins to 30 mins and the extracted mixture is extracted for from 2 mins to 30 mins.

10. A process according to claim 1 wherein the water has a temperature of from 90° C. to 130° C.

11. A process according to claim 5 wherein the water has a temperature of from 90° C. to 130° C.

12. A process according to claim 7 wherein the water has a temperature of from 90° C. to 130° C.

13. A process according to claim 1 wherein the primary tea extract is concentrated to a dry matter content of 10% to 30% by weight.

* * * * *